United States Patent

[11] 3,590,337

[72] Inventor Horst A. R. Wegener
Carlisle, Mass.
[21] Appl. No. 767,230
[22] Filed Oct. 14, 1968
[45] Patented June 29, 1971
[73] Assignee Sperry Rand Corporation

[54] PLURAL DIELECTRIC LAYERED ELECTRICALLY ALTERABLE NON-DESTRUCTIVE READOUT MEMORY ELEMENT
3 Claims, 4 Drawing Figs.

[52] U.S. Cl. .......... 317/234 R, 317/235 B, 317/214 UA
[51] Int. Cl. .......... H01c 7/14
[50] Field of Search .......... 317/235, 21.1, 46, 9

[56] References Cited

UNITED STATES PATENTS

| | | | |
|---|---|---|---|
| 3,462,657 | 8/1969 | Brown | 317/235 |
| 3,422,321 | 1/1969 | Tombs | 317/235 |
| 3,428,875 | 2/1969 | Snow | 317/235 |
| 3,455,020 | 7/1969 | Dawson et al. | 317/235 |

OTHER REFERENCES

J ELECTROCHEM SOC: SOLID STATE SCIENCE, " Properties of Si ON Films on Silicon" by Brown et al. Vol. 115, No. 3, pages 311— 317. March 1968

APPLIED PHYSICS LETTERS " Evidence of Hole injection and Trapping in Silcon Nitride Films Prepared by Reactive Sputtering" by Hu et al. pages 97— 99. 1 Feb. 1967

THE BELL SYSTEM TECHNICAL JOURNAL, " A Floating Gate and its Application to Memory Device" by Kahrg et al. pages 1288— 1295, August 9, 1967.

*Primary Examiner*—Jerry D. Craig
*Attorney*—S. C. Yeaton

ABSTRACT: A memory element comprising a semiconductor substrate and a conductive electrode separated from said substrate by a plurality of dielectric layers of different conductivities. The "write-in" and "storage time" characteristics of the memory element are determined by the permittivity, the electric field and the current density versus electric field characteristic of the most conductive dielectric layer. The ratio of the conductivities of the most conductive dielectric layer to a contiguous dielectric layer is more than 2. The current density versus electric field characteristic of each dielectric layer is highly nonlinear. One form of the invention is a capacitor; another form is a field effect transistor utilizing said capacitor as the gate electrode structure.

INVENTOR.
HORST A. R. WEGENER
BY Robert J. Haase
ATTORNEY

INVENTOR.
HORST A. R. WEGENER
BY
Robert J. Haase
ATTORNEY

PLURAL DIELECTRIC LAYERED ELECTRICALLY ALTERABLE NON-DESTRUCTIVE READOUT MEMORY ELEMENT

The invention described herein was made in the performance of work under a NASA contract and is subject to the provisions of Section 305 of the National Aeronautics and Space Act of 1958, Public Law 85-568 (72 STA. 435; 42 U.S.C. 2457).

BACKGROUND OF THE INVENTION

The utilization of nondestructive readout binary storage elements in digital computers is well known. Generally, it is desired that the storage element be of small size, require low power during reading and writing operations and no power at other times, and that it necessitate the use of minimal interface circuits between the storage element per se and the remainder of the digital computer. It is particularly desirable that the same basic circuit element and fabrication process be used for every computer component including the memory component to help realize the goal of an all-microcircuited digital computer. A significant step in that direction was achieved with the invention of the electrically alterable nondestructive readout field-effect transistor memory element disclosed in copending patent application Ser. No. 648,414, filed June 23, 1967 now U.S. Pat. No. 3,508,211 in the name of the present inventor and assigned to the present assignee.

The field-effect transistor of that copending application is characterized by a conduction threshold which is electrically alterable by the application of voltage pulses of predetermined amplitude and polarity between the gate electrode and the transistor substrate. It is believed that the aforesaid pulses place charges in the dielectric material of the gate in a thin region of the material adjacent the interface between the material and transistor substrate. The charges appear to become trapped and remain in the dielectric material for long periods following the removal of the voltage pulse which created them. The result is a relatively permanent shift in the conduction threshold of the transistor. By the application of high voltage pulses of opposite polarity, binary valued conduction thresholds can be established in the transistor. Upon the application of a predetermined voltage having a value intermediate to said thresholds and the application of a suitable bias to the source and drain electrodes of the transistors, the binary condition of the transistor can be sensed by monitoring the magnitude of the resulting current between the source and drain. The amplitude of the sensing voltage is insufficient to change the preexisting conduction threshold so that nondestructive readout is achieved.

In accordance with the aforementioned copending application, the variable threshold transistor comprises a wafer of silicon into which are diffused source and drain junctions. A layer of silicon nitride passivates the source and drain junctions and forms the gate electrode dielectric layer. Although the mechanism by which the conduction threshold of the variable threshold transistor is electrically altered is not completely understood, some evidence has been found that barrier effects may play a significant role. In any case, it appears that the trapped charges giving rise to the alterable conduction thresholds are located within a thin region in the gate dielectric material adjacent the interface between the transistor substrate and the material. The lack of a complete understanding of the mechanism for controlling the transistor conduction threshold engenders difficulties in reproducibly controlling the conduction thresholds on a production basis.

SUMMARY OF THE INVENTION

In accordance with one form of the present invention, reproducibly controllable conduction thresholds are achieved by providing a plurality of contiguous dielectric layers having different electrical conductivities as the gate dielectric material of a field-effect transistor. A potential is applied between the gate electrode and the semiconductor substrate of the transistor to produce different current densities in each of the dielectric layers. A negative charge forms at the interface between the dielectric layers if the potential is such that more electrons arrive at the interface from one side than are conducted away from the other side. Conversely, a positive charge builds up at the interface if more electrons are conducted away from the interface than arrive at it from the other side.

Since it is both the amount and/or the polarity of the stored charge that constitutes the information of the memory cell, there are three ways in which the information can be altered. One depends on the storage at and the removal from the interface of positive charges only. Another depends on the storage at and the removal from the interface of negative charges only. The third, finally, combines both by the replacement of positive charges by negative charges, or negative charges by positive charges, depending on the polarity of the applied field. The last two of the three possible mechanisms have been observed experimentally. The effect of these three modes of change on the field-effect transistor threshold voltage will be different. The first will have a constant low threshold voltage, which is independent of amplitude and duration of the applied field, after this constant value has been reached. The high threshold voltage will depend both on amplitude and duration of pulse. The second case will also have a constant low threshold voltage and a high threshold voltage that is dependent on duration and amplitude of the applied pulse. The third case will, in principle, have both high and low threshold voltage levels dependent on polarity, duration, and amplitudes of the applied pulses.

Each of the dielectric layers is characterized by a highly nonlinear current density versus electric field relationship which allows for the rapid charging of the dielectric interface (and consequent rapid changing of the conduction threshold of the transistor) in response to applied high potentials, and it precludes rapid change in the stored charge at low potentials. Thus, the relatively small electric field resulting from an applied interrogation signal or from the stored charge itself produces no significant alteration of the conduction threshold of the transistor. The presence of the stored charge is sensed in terms of its effect on the conductivity of the underlying semiconductor substrate. In the case of a field-effect transistor, said conductivity is ascertained by applying a voltage to the transistor gate and monitoring the resulting source-to-drain current.

An insulated-gate-field-effect transistor is, in effect, an interacting combination of a capacitor and two oppositely biased PN junctions. The same phenomena which determine the conduction threshold voltage of the transistor also determine the flat-band voltage and the capacitance of the capacitor. Accordingly, a second form of the present invention achieves storage effect in a capacitor independent of a transistor.

DESCRIPTION OF THE PREFERRED EMBODIMENT

In accordance with the present invention, information is stored in the form of positive or negative electrical charges in the layered-dielectric gate structure of a field-effect transistor or simply in the capacitor element per se which comprises said gate structure. The presence of the stored charges is manifested by a change in the conduction threshold voltage in the case of the field-effect transistor species of the invention or by a change in the voltage dependent capacitance variation in the case of the capacitor species of the invention. The conduction threshold voltage of a field-effect transistor is the minimum voltage applied to the gate electrode that causes significant current flow between the source and drain electrodes. The value of the conduction threshold voltage is affected by charges stored in the dielectric material which separates the gate electrode from the transistor substrate. For example, in the case of a P-channel insulated-gate-field-effect transistor, the conduction threshold voltage becomes more negative if positive charges are stored in the gate dielectric. Conversely, the conduction threshold voltage becomes more positive if negative charges are stored in the gate dielectric.

A similar effect takes place when charges are stored in the dielectric of a capacitor. In particular, the capacitance-voltage relationship of the capacitor is affected by the stored charges. The on set of change in capacitance in response to a voltage applied to the capacitor is characterized by the so-called flat-band voltage. The flat-band voltage is affected by charges stored in the dielectric in the same way as the conduction threshold voltage of a field-effect transistor. For example, assuming a capacitor comprising an N-type semiconductor substrate and a metal electrode separated from the substrate by a dielectric material, the flat-band voltage becomes more negative if positive charges are stored in or negative charges are removed from the dielectric. Conversely, the flat-band voltage becomes more positive if negative charges are stored in or positive charges are removed from the dielectric.

In terms of a memory device application, charges are "written" into or "erased" from the dielectric of a field-effect transistor by the application of a voltage between the gate electrode and the transistor substrate sufficient to change the conduction threshold. Charges are written into or erased from the dielectric of the capacitor by application of a potential across the capacitor terminals sufficient to change the flat-band voltage.

Figure 1:
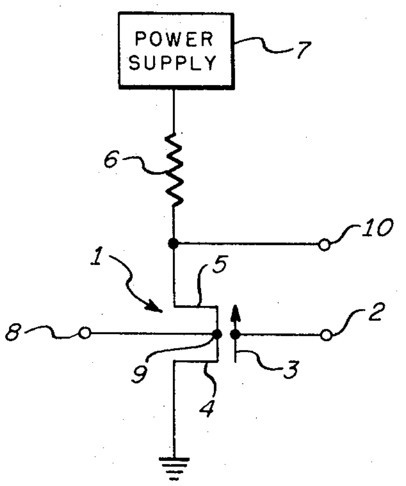
FIG. 1 is a schematic diagram of a field-effect transistor embodiment of the invention.

FIG. 1 represents a field-effect transistor embodiment of the present invention adapted for the writing of information and the interrogation or reading of the stored information. Information is written into P-channel enhancement insulated-gate field-effect transistor 1 by the application of a potential above a predetermined value between terminal 8 at substrate 9 and terminal 2 at gate electrode 3. Source 4 of transistor 1 is connected to ground while drain 5 is connected through resistor 6 to a negative voltage power supply 7. In the event that an interrogation signal applied between ground and terminal 2 exceeds the conduction threshold voltage of transistor 1, the impedance between drain 5 and source 4 is reduced to a low value at least an order of magnitude smaller than the impedance value of resistor 6. Conversely, if the interrogation voltage applied between ground and terminal 2 is less than the conduction threshold voltage, the impedance presented between drain 5 and source 4 is at least an order of magnitude greater than the impedance of resistor 6. In the former case, substantially all of the voltage of source 7 is dropped across resistor 6. In the latter case, substantially all of the voltage of source 7 is dropped across transistor 1, i.e., between output terminal 10 at drain 5 and ground.

The application of a potential above a predetermined value between gate electrode terminal 2 and substrate terminal 8 causes a shift in the conduction threshold voltage of transistor 1 representing stored information. The polarity of the applied potential determines the direction of the conduction threshold voltage shift. The application of potential across terminals 2 and 8 below said predetermined value but between the values of said threshold voltages permits nondestructive readout of the stored information.

Figure 2:
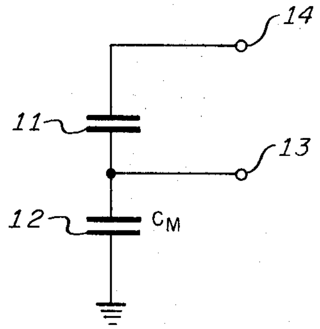
FIG. 2 is a schematic diagram of a capacitor embodiment of the present invention.

The same phenomena that provide a memory effect in the field-effect transistor structure of FIG. 1 provide a similar effect in the capacitor structure of FIG. 2. Referring to FIG. 2, capacitor 11 is of a fixed value of capacitance equal to the maximum capacitance of memory capacitor 12. The flat-band voltage of memory capacitor 12 is set by the application of a voltage above a predetermined amount between contact 13 and ground. The polarity of the applied voltage establishes the sense of the flat-band voltage shift as in the case of the conduction threshold voltage shift of the field-effect transistor. The existing value of the flat-band voltage is sensed by applying an interrogation potential to terminal 14 below said predetermined amount. When the flat-band voltage of memory capacitor 12 is made such that the capacitance of capacitor 12 becomes equal to that of fixed capacitor 11, one-half of the interrogation voltage applied to terminal 14 appears at output terminal 13. When the capacitance of memory capacitor 12 is made much smaller than that of fixed capacitor 11, substantially all of the interrogation voltage applied to terminal 14 appears at terminal 13. A flat-band voltage higher than the interrogation voltage is associated with a high capacitance, and a flat-band voltage lower than the interrogation voltage is associated with a low capacitance.

Figure 3:
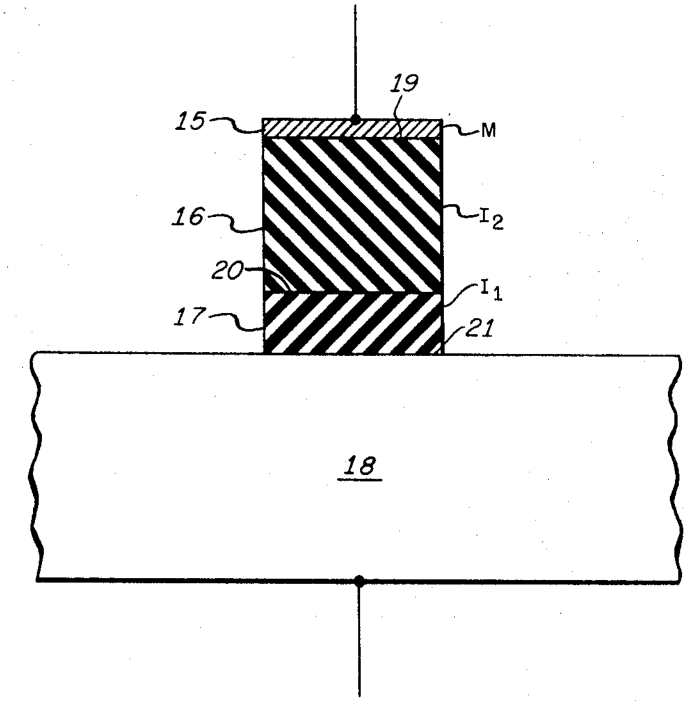
FIG. 3 is an idealized sketch of a cross section of the dielectric-layered structure producing a memory effect in the embodiments of FIGS. 1 and 2.

The memory behavior discussed above in connection with the insulated-gate-field-effect transistor 1 of FIG. 1 and the capacitor 12 of FIG. 2 is achieved in accordance with the present invention by the special dielectric-layered structure represented in FIG. 3. Referring to FIG. 3, the structure comprises in cross section a metal electrode 15, a first layer of dielectric material 16, a second layer of dielectric material 17 and a substrate of semiconductor material 18. Layers 16 and 17 are of different electrical conductivity, the ratio of conductivities being more than about 2. It is desirable that barrier effects be minimized at each of the three interfaces 19, 20 and 21 between the respective metal, dielectric and semiconductor layers. The memory effect of interest in the present invention arises from the storage of charge at the interface 20 between the two layers 16 and 17 of dielectric material of different conductivities. When a potential is applied across the two terminal layers 15 and 18 of the dielectric-layered structure of FIG. 3, the resulting electric field produces a different current density in each of the dielectric layers 16 and 17. A negative charge forms at interface 20 if the potential applied to terminals 15 and 18 is such that more electrons arrive at interface 20 through one dielectric layer than are conducted away from the interface through the other dielectric layer. Conversely, a positive charge is produced at interface 20 if more electrons are conducted away from the interface than toward it.

Figure 4:
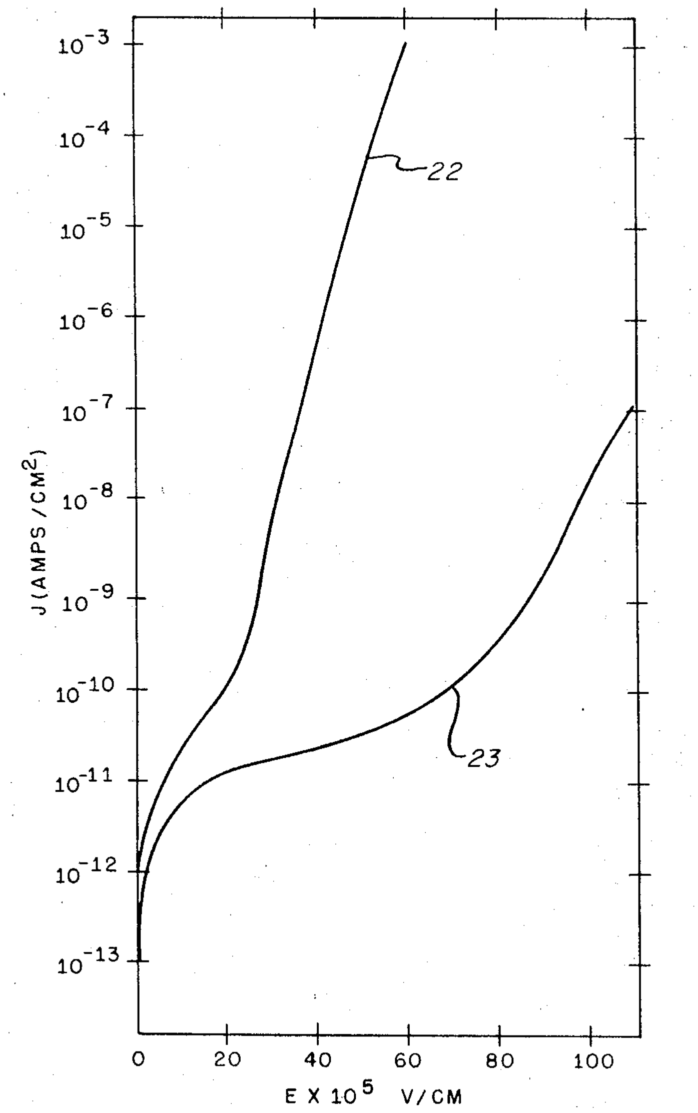
FIG. 4 are plots of the current density versus electric field of a typical pair of contiguous dielectric layers utilized in the structure of FIG. 3.

It is important that both dielectric layers 16 and 17 exhibit a highly nonlinear current density versus electric field relationship. Such a relationship allows for the rapid buildup of charge at interface 20 when a relatively high potential is applied to terminals 15 and 18 and allows for the disproportionately low rate of change of the stored charge upon the application of a lower (interrogating) potential to terminals 15 and 18 or the presence of the electric field due to the stored charge itself. Thus, nondestructive readout and nonvolatile memory are achieved in an electrically alterable memory element. Typical J versus E curves of two dielectric layers such as layers 16 and 17 of FIG. 3 having the required nonlinearity are plotted in FIG. 4. The steeper curve 22 of FIG. 4 is characteristic of silicon nitride having no significant oxygen constituent. The other curve 23 is characteristic of silicon nitride containing some oxygen (silicon oxynitride). It has been found that the length of time required to store charges or to dissipate stored charges at interface 29 of the structure represented in FIG. 3 is approximately related to the quotient ($\epsilon$ E/$j$(E)) where $\epsilon$ is the permittivity of the more conductive one of the layers 16 and 17, E in volts per centimeter is the electric field across the more conductive dielectric layer (either due to an applied voltage giving rise to a field $E_a$ or due to the density of charges stored in the dielectric which results in a field $E_{st}$), and $j$(E) in amperes per square centimeter is the highly nonlinear relationship between the field across the more conductive dielectric and its current density.

The charge stored at the interface between the two dielectric layers of the present invention is sensed by the mobile charges in the underlying semiconductor substrate. The mobile charges react either by being attracted to or repelled from the surface of the semiconductor according to the polarity of the charge stored at the interface between the dielectric layers. The reaction of the mobile charges changes the current-voltage characteristics of the insulated-gate-field-effect transistor embodying the dielectric layered gate structure and the capacitance-voltage characteristics of the metal-insulator-gate capacitor embodying the multilayer dielectric insulator.

The field $E_{st}$ due to the stored charges at the interface between the two dielectric layers of different conductivity can be represented by $E_{st}=(\sigma/\epsilon)(1-X_1/X_0)$ where $\sigma$ is the charge stored per unit area in coulombs per square centimeter, $\epsilon$ is the permittivity of the more conductive dielectric layer in farads per centimeter, $X_o$ is the total thickness of both dielectric layers in centimeters, and $X_1$ is the average distance of the stored charge from the silicon interface in centimeters. The charge density $\sigma$ is the amount of charges accumulated through the application of current density $j$ over a period of time, i.e., $$\sigma=\int j dt.$$

The value of the field $E_{st}$ due to the stored charge can be calculated readily by known formulas from the measured effects on the current-voltage characteristics as a function of the voltage applied to the gate electrode of the respective transistor or to the top plate of the respective capacitor.

For example, the time $\Delta t$ required to charge the interface between the dielectric layers is calculated to be $0.5\times10^3$ sec using the typical values of permittivity $\epsilon=5\times10^{13}$ farads per centimeter, field due to the stored charge $E_{st}=10\times10^5$ volts per centimeter, and the measured value of the current density versus electric field at the applied field $E_a$ value of $60\times10^5$ volts per centimeter. For the typical total thickness of 1,000 Angstroms of dielectric material, the voltages $E_{st}$ and $E_a$ would be 10 volts and 60 volts, respectively. Utilizing FIG. 4, it is found that $j(E)$ at $60\times10^5$ volts per centimeter is $10^{13}$ amperes per square centimeter. The "write-in" time of the memory device of the present invention is the time necessary to create the field $E_{st}$ by storing charges with the aid of the high current density due to the applied field $j(E_a)$. Substituting the appropriate values into the expression $\Delta t=\epsilon E_a/j(E_a)$ one finds the approximate "write-in" time to be $0.5\times10^{13}$ seconds.

The corresponding storage time can be calculated from a similar expression. By definition "storage time" is the time required to reduce the electric field due to the stored charge to half of its initial value. Using the value of $E_{st}=5\times10^5$ volts per centimeter and referring to FIG. 4, one finds $j(E_{st})$ to be $10^{112}$ amperes per square centimeter. The value of the above defined "storage time" $\Delta t$ can be calculated to be approximately equal to three days using the approximate expression $\Delta t=E_{st}/j(E)$. Experimental evidence has been obtained of storage times extending over 3 months duration. Extrapolation of the observed experimental data indicates that storage times of many years may be achieved. "Write-in" times generally in the range from 10 microseconds to 100 milliseconds and some times as little as a fraction of a microsecond also have been observed.

It has been found that multiple dielectric layered capacitor elements also exhibit memory characteristics. For example, satisfactory operation has been achieved in a device wherein the metal electrode and the semiconductor substrate corresponding to electrode 15 and substrate 18 of FIG. 3 were separated by contiguous layers of silicon dioxide, silicon nitride and silicon oxynitride.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A memory element comprising,
a semiconductor substrate,
a conductive electrode, and
a dielectric body comprising a plurality of contiguous layers of dielectric material separating said substrate from said electrode,
said dielectric layers being arranged so that an electric field will be established across said layers when a potential is applied between said semiconductor substrate and said conductive electrode,
each of the dielectric layers being selected to provide layers each having prescribed individual electrical properties and contiguous layers having prescribed relative electrical properties, all prerequisites being essential to the formation of an element having a memory of determinable life extent, and said individual electrical properties and said relative electrical properties being those in accordance with all of said prerequisites such that
a. each layer exhibits a current density versus electric field characteristic that is highly nonlinear,
b. the conductivities of two contiguous layers are different,
c. the ratio of the conductivity of the more conductive layer of the two contiguous layers to that of the contiguous layer is greater than 2:1, and
d. the layer of greater conductivity has a ratio of permittivity times voltage gradient to resulting current density corresponding to a predetermined short write-in time;
said memory element being characterized by its predeterminable short interval write-in time and its relatively long interval charge retention time under given applied fields.

2. A memory element comprising
a semiconductor substrate,
a conductive electrode, and
a plurality of contiguous layers of dielectric material separating said substrate from said electrode,
one of said layers of dielectric material being silicon nitride and another of said layers of dielectric materials being silicon oxynitride,
the ratio of the conductivities of the most conductive dielectric layer to a contiguous dielectric layer being more than 2,
said most conductive dielectric layer having a ratio of permittivity times voltage gradient to resulting current density sufficient to provide a write-in time of less than about 100 milliseconds,
the current density versus electric field characteristics of each dielectric layer being highly nonlinear,
whereby electric charge forms at the interface between said most conductive dielectric layer and said contiguous dielectric layer in a short time under the influence of a relatively high electric field and in a disproportionately long time under the influence of a relatively low electric field.

3. A memory element comprising,
a semiconductor substrate,
a conductive electrode, and
a plurality of contiguous layers of dielectric material separating said substrate from said electrode,
one of said layers of dielectric material being silicon nitride and another of said layers of dielectric material being silicon oxynitride,
the ratio of conductivities of the most conductive dielectric layer to a contiguous dielectric layer being more than 2,
said most conductive dielectric layer having a ratio of permittivity times voltage gradient to resulting current density sufficient to provide a short write-in time,
the current density versus electric field characteristics of each dielectric layer being highly nonlinear.